May 7, 1963  W. C. RIESTER ETAL  3,088,154
WIPER ARM
Filed Aug. 11, 1960
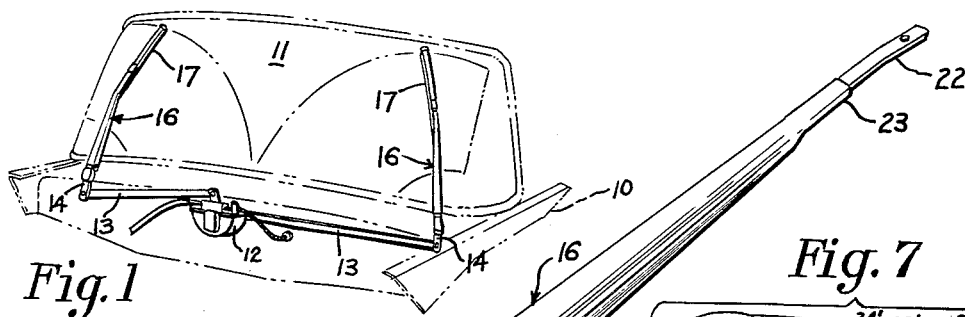
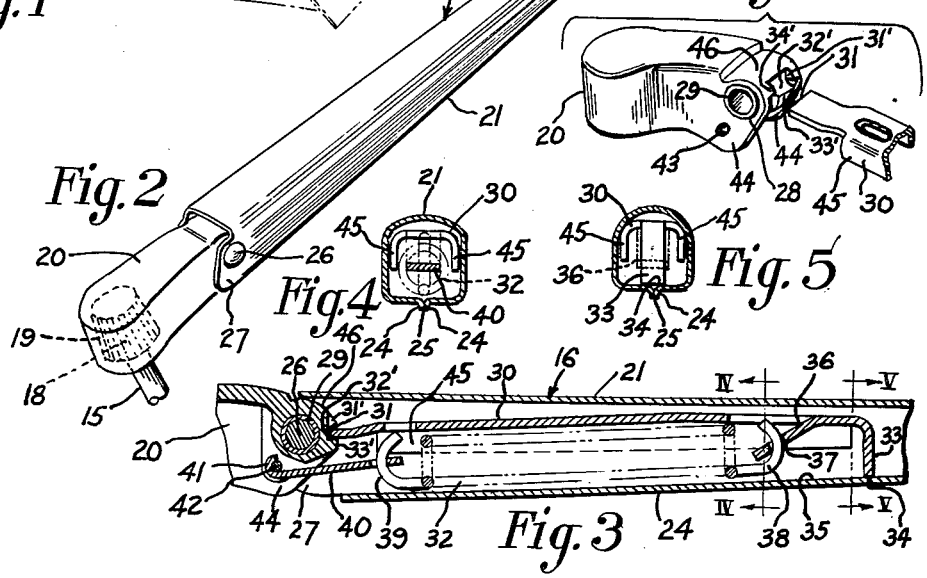
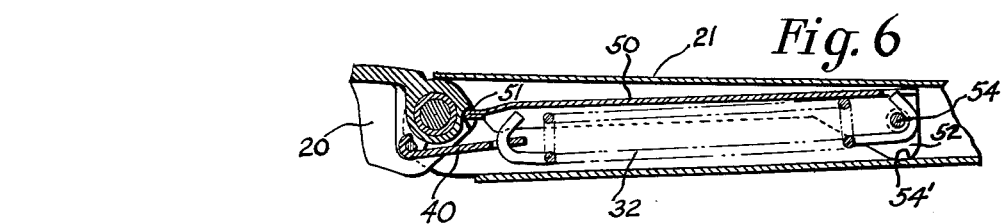
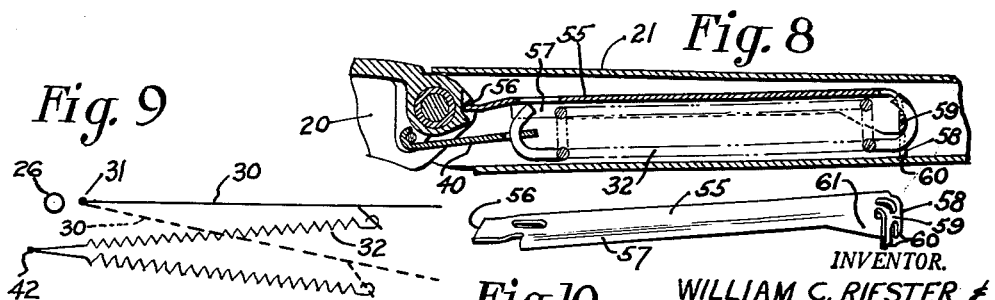
INVENTOR.
WILLIAM C. RIESTER &
BY ANTHONY C. SCINTA
Bean Brooks Buchley & Bean
ATTORNEYS 3,088,154
WIPER ARM
William C. Riester, Williamsville, and Anthony C. Scinta, Hamburg, N.Y., assignors to Trico Products Corporation, Buffalo, N.Y.
Filed Aug. 11, 1960, Ser. No. 48,974
8 Claims. (Cl. 15—250.34)

The present invention relates to an improved arm of the type used for mounting a windshield wiper.

It is an important object of the present invention to provide a windshield wiper arm which will pivot freely toward and away from an associated windshield, thereby permitting the wiper carried thereby to maintain good wiping contact with the windshield. This is accomplished by greatly reducing the friction of the pivot pin on which the section of the arm which pivots toward and away from an associated windshield is mounted. The reducing of this friction to permit the wiper to readily follow the curvature of the windshield therefore tends to reduce the possibility of the wiper being lifted from the windshield at high vehicle speeds by strong air currents because the reduction of friction reduces the lag of the pivoted portion of the wiper arm in following the receding lateral portion of the curved windshield. Such wiper lifting is obviated because the rapidly moving air currents do not have a chance to flow under the wiping lip portion of the wiper because there is no tendency of this lip to leave the windshield. Furthermore the elimination of friction at the pivot point, in addition, permits lower arm spring pressures to be utilized because the spring does not have to overcome the frictional force at the pivot point. This permits the use of a weaker spring and also permits the wiper arm to be made of more lightweight materials, thereby reducing its inertia in operation. Furthermore the use of lightweight materials for the arm reduces the loading on the wiper motor and the various linkages of the wiper system.

Another object of the present invention is to provide a wiper arm construction which, in a novel manner, automatically varies the pressure it exerts on a wiper in accordance with the position on the windshield occupied thereby, to thus provide improved wiping. In this respect the spring structure which biases a portion of the arm toward an associated windshield tends to increase the force which the arm causes the wiper to exert on the windshield as the spring contracts when the pivoted portion of the arm passes onto the rearwardly extending lateral portions of a curved windshield, this being contrary to what would normally be expected. The increasing of arm pressure on the rearwardly extending lateral portions of the windshield also enhances the resistance of the wipers to being lifted from the windshield by the air currents which are particularly strong on the receding lateral portions of the windshield.

A further object of the present invention is to provide a wiper arm having a replaceable spring carrying cartridge or support therein which eliminates the need for anchoring one end of the arm biasing spring directly to the portion of the wiper arm which pivots toward and away from an associated windshield. The elimination of such a connection thus eliminates the necessity to bore holes in the sides of the wiper arm in which a rivet is mounted to support one end of the spring. The elimination of such a rivet permits the portion of the wiper which pivots toward and away from the associated windshield to be substantially unbroken throughout the length thereof. This increases its strength while permitting the wiper arm to be made of lighter stock. Furthermore, the elimination of such a rivet eliminates the possibility of rust stains on the outside of the wiper arm produced by the rusting of the rivet which may not be made of the same rust proof stainless steel material as the arm section on which it is mounted. A related object of the present invention is to permit the replacement of a spring cartridge or of a spring in the event that the arm spring loses its force as a result of long use, thereby effecting an economy for the vehicle owner by eliminating the need to replace the entire arm in the event that only the spring needs replacement. A further related object of the present invention is to facilitate the assembly of a wiper arm because specialized equipment for inserting a biasing spring within the substantially totally enclosed wiper arm portion and hooking it thereto is not required because, as noted above, one end of the spring is anchored to the replaceable spring cartridge. Other objects and attendant advantages of the present invention will readily be perceived hereafter.

The wiper arm of the present invention which is capable of achieving the foregoing objects consists of a mounting head portion which is adapted to be mounted on a rockshaft in any conventional manner. Pivotally secured to the mounting head portion is an elongated portion which moves back and forth on the pivotal connection in following the curvature of the windshield. The elongated portion mounts a wiper carrying portion on the outer end thereof. In accordance with the present invention a pressurizing assembly including a spring carrying cartridge constituting spring support means is provided. This spring carrying cartridge or spring support is adapted to be inserted within a hollow portion of the elongated arm portion. A tension spring has one end thereof secured to a portion of the cartridge and the other end thereof mounted on the mounting head portion. The cartridge is provided with a pivot which rests on a fulcrum provided by the mounting head portion. The cartridge also has a portion which abuts the inside of the elongated arm portion to thereby cause the pressure of the spring to be transmitted to the elongated portion notwithstanding that the spring is not directly mounted on the latter. As the elongated portion of the arm moves toward and away from an associated windshield during wiper operation, the cartridge pivots about its fulcrum on the mounting head portion and also relieves the pivot between the elongated arm portion and the mounting head portion from the frictional force which the spring would cause it to exert in the absence of the above-mentioned fulcrum and pivot connection. The present invention will be more fully uderstood when the following portions of the specification are read in conjunction with the accompanying drawings wherein:

FIG. 1 is a fragmentary perspective view of an automotive vehicle having a wiper system which includes the improved arms of the present invention;

FIG. 2 is a perspective view of the improved arm of the present invention;

FIG. 3 is a view partly in cross section taken through a plane bisecting the arm substantially along its longitudinal axis;

FIG. 4 is a cross sectional view taken along line IV—IV of FIG. 3;

FIG. 5 is a cross sectional view taken along line V—V of FIG. 3.

FIG. 6 is a view partly in cross section taken along the longitudinal axis of the wiper arm and showing an alternate embodiment of the modification shown in FIG. 3;

FIG. 7 is a perspective view showing the manner in which the pivot of the spring carrying cartridge fits onto the fulcrum of the mounting head;

FIG. 8 is a cross sectional view taken along the longitudinal axis of the wiper arm and showing a preferred alternate embodiment of the present invention;

FIG. 9 is a schematic diagram showing how the arm pressure increases as the spring tension decreases; and FIG. 10 is a perspective view of the spring carrying cartridge used in the embodiment of FIG. 8.

In FIG. 1 an automotive vehicle 10 is shown having a windshield 11 mounted thereon in any conventional manner. Suitably secured to the firewall is a wiper motor 12 having links 13 affixed thereto. Links 13 in turn are connected to crankarms 14 mounted on rockshafts 15 which in turn mount wiper arms 16 which carry wiper blades 17. Rockshaft 15 has a splined burr 18 formed at the outer end thereof which is adapted to be received in mating recess 19 (FIG. 2) in the mounting head portion 20 of wiper arm 16. The mounting head may be retained on splined burr 18 by means of a spring latch (not shown) such as the type shown in Patent No. 2,781,540, this mode of connection not forming a part of the present invention.

The wiper arm 16 of the present invention includes a mounting head portion 20, mentioned above, and the elongated hollow portion 21 which carries a saber 22 at the outer end thereof. Saber 22 is in the form of a solid steel rod and is held at the outer end of elongated hollow portion 21 by crimping the outer section 23 of portion 21 about rod 22 in any suitable manner which will hold the latter in position. Any other suitable means of attachment may also be used. Elongated hollow portion 21 is formed of a suitably formed sheet of metallic material with the opposing sides 24 (FIGS. 4 and 5) joined together by a seam weld 25 extending substantially throughout the entire length of arm portion 21 on the rear side thereof. Because of the tubular construction of elongated hollow portion 21 great twist resistance is realized. A pivot in the form of rivet 26 extends through aligned ears 27 (FIGS. 2 and 3) at the larger portion of elongated section 21 and bore 28 (FIG. 7) in mounting head 20. A bearing 29 lines bore 28. Rivet 26 may be removed to permit disengagement between mounting head 20 and elongated portion 21 in the event it is desired to replace the spring carrying cartridge 30, as described in greater detail hereafter.

The spring carrying cartridge or support constituting movable spring support means 30 is a generally elongated member having a pivot 31 at one end thereof (FIGS. 3 and 7) which is adapted to rest in the recessed portion 32' of mounting head 20 which provides a fulcrum for pivot 31. As can be seen from FIGS. 3 and 7, fulcrum 32' includes opposed staggered tines 31', 33', and 34' which are adapted to engage opposite sides of the pivot 31 to thereby retain spring carrying cartridge 30 in position on mounting head 20. The tine construction is used because of ease of manufacturing. Spring carrying cartridge 30 also includes an elongated central portion (not numbered) of sufficient rigidity not to be deflected by the force of spring 32 to which it is subjected. Extending substantially perpendicularly from the central portion of the spring carrying cartridge is an outer end portion 33 having an end 34 which is adapted to abut the internal surface 35 of elongated portion 21 to thereby transmit the spring force to the latter. As elongated hollow portion 21 pivots toward and away from windshield 12, end 34 of cartridge 30 will slide on the inner surface of elongated hollow arm portion 21. The central portion of cartridge 30, near the vicinity of portion 33, is bent downwardly into a tab 36 having aperture 37 therein for receiving the outer end 38 of spring 32. The inner end 39 of spring 32 extends through an aperture (not numbered) in one end of strap 40, the other end of which is formed into a hook 41 which fits about pin 42 extending between aligned apertures 43 (FIG. 7) in ears 44 of the mounting head 20. It can thus be seen that the force provided by spring 32 when anchored between tab 36 and pin 42 tends to rotate spring carrying cartridge 30 in a clockwise direction (FIG. 3) about rivet 26 and thus causes elongated arm portion 21 to likewise pivot because of the abutting engagement between the end 34 of flange 33 and the inside surface 35 of elongated arm portion 21. As can be seen from FIGS. 4 and 5, the central portion of spring carrying cartridge 30 is generally in the form of a channel with legs 45 which lend rigidity thereto. Furthermore, the width of the channel is substantially the width of the inside of the wiper arm to stabilize the fit therebetween.

When it is required to assemble the wiper arm of the present invention it is merely necessary to hook one end of spring 32 into the receiving portion of spring carrying cartridge 30 and hook strap 40 which is affixed to the other end of the spring onto pin 42 in the mounting head portion and place pivot 31 in position on fulcrum 32' and pivot spring carrying cartridge 30 in a counterclockwise direction (FIG. 3) until it occupies the position shown in FIG. 3. It can thus be seen that mounting head portion 20 carries the load of spring 32 at fulcrum 32', the point of contact of spring carrying cartridge 30 therewith being through pivot 31. After the foregoing relationship between mounting head 20 and spring carrying cartridge 30, including spring 32, has been established it is merely necessary to slide the end of elongated hollow portion 21 over and enclose the spring carrying cartridge 30 until such time as the apertures in opposed ears 27 are in alignment with the bore provided by bearing 29. Thereafter rivet 26 is inserted through the aligned apertures and the bore of bearing 29 to retain the assembly in engagement. A stop 46 is provided to prevent extreme clockwise rotation of elongated portion 21 about rivet 26 to prevent strap 40 from becoming disassociated from pin 42. In other words stop 46 always causes mounting head 20 and elongated portion 21 to maintain an orientation which would always cause spring 32 to remain under tension. This is achieved by causing the portion of elongated hollow tubular member 21 which is adjacent stop 46 to abut this stop after a predetermined relative movement has taken place. Stop 46 comes into play only when the wiper arm is not mounted in position on the windshield to thereby prevent the above-described loosening of spring 32.

If it is desired to change spring cartridge 30, it is merely necessary to slide rivet 26 from its assembling position, reverse the steps enumerated above to remove cartridge 30, and then insert a new cartridge 30, or merely a spring 32. It can readily be seen that since substantially the entire force of the spring 32 is absorbed by pivot 31 and fulcrum 32', this spring force is not transmitted to the pivotal connection provided between rivet 26 and bearing 29. The total frictional force opposing relative rotation between arm portion 21 and mounting head portion 20 is therefore of a much smaller value than if the spring pressure was borne by the rivet 26 because of the relatively small area of contact between pivot 31 and fulcrum 32'.

In FIG. 9 a schematic representation is shown which discloses why the total arm pressure is greater when the wiper arm is on the receding lateral portion of the windshield, the solid line representation of cartridge 30 indicating the position which the arm occupies on the central portion of the windshield and the dotted line representation of cartridge 30 depicting the position which it occupies on the receding lateral portion. It can readily be seen that the perpendicular distance between the line of force of the spring 32 and the center of rivet 26 is greater when the wiper is on the receding lateral portion than when it is on the central portion of the windshield. This increase of length is more than enough to offset the decrease in spring tension to provide a resultant moment which is greater when the spring is contracted than when it is expanded. This increase of wiper arm pressure enhances the ability of the wiper to remain on the lateral receding portion of the windshield notwithstanding the existence of strong air currents in this region.

In FIG. 6 an alternate embodiment of the cartridge is disclosed. The elongated hollow portion 21 and mounting head portion 20 are identical to the same structure described above with respect to the previous figures and a detailed description is therefore deemed unnecessary. The same is true of spring 32 and strap 40. The only difference resides in the spring carrying cartridge 50. This cartridge has its pivot 51 formed of material which is bent over, as shown, to provide increased rigidity as well as a rounded bearing surface to facilitate pivotal movement on the associated fulcrum of mounting head 20. The opposite portion of cartridge 50 is formed into two spaced ears 52, the lowest portions 54′ of which engage the inside surface of elongated arm portion 21. A rivet 54 extends between spaced ears 52 and serves as an anchor for one end of spring 32. The central portion of cartridge 50 has a channel shaped configuration similar to that described above with respect to cartridge 30.

An alternate preferred modification of the present invention is disclosed in FIGS. 8 and 10. As noted above, this modification possesses no changes from those described above with respect to the mounting head portion 20, elongated hollow portion 21, spring 32, and strap 40. Again the only difference resides in the specific construction of cartridge 55. The pivot 56 of cartridge 55 is similar to pivot 31 of cartridge 30. This pivot may have a rounded end or may be sheared off during fabrication. The central portion of cartridge 55 is channel shaped and has depending sides 57 similar to those described above with respect to the other embodiments. The bent over portion 58 is provided at the outer end of cartridge 50 and has a bridge member 59 formed integrally therewith to provide an anchoring point for the outer end of spring 32. The extreme edges 60 of bent over portion 58 are adapted to engage the inside of elongated hollow member 21. The outer ends of the sides 57 of the channel are widened at 61 to provide a firm bearing surface for bent over portion 58 to thereby positively prevent the spring tension from bending bent over portion 58 further than is desired and also permitting lighter weight stock to be used in the fabrication of cartridge 55.

It can thus be seen that the wiper arm of the present invention is manifestly capable of achieving all of the above-enumerated objects, and while preferred embodiments have been disclosed, it is to be understood that the present invention is not to be limited thereto, but may be otherwise embodied within the scope of the following claims.

What is claimed is:

1. A wiper arm comprising a mounting head portion, an elongated hollow portion, means on said elongated hollow portion for mounting a windshield wiper, first pivot means coupling said mounting head portion and said elongated hollow portion, a pressurizing assembly comprising movable spring supporting means adapted to be inserted into said elongated hollow portion, a spring, means for anchoring one end of said spring to said spring supporting means, means for anchoring the other end of said spring to said mounting head portion, means on one end of said spring supporting means adapted to provide effective slidable engagement relative to a portion of the inside of said elongated hollow portion to thereby transmit the spring pressure from said spring supporting means to said elongated hollow portion, and second pivot means including a pivot edge on the opposite end of said spring supporting means and a fulcrum on said mounting head portion for permitting relative movement between said spring supporting means and said mounting head portion during pivotal movement of said elongated hollow portion on said first pivot means, said second pivot means and said slidable engagement relieving friction at said first pivot means.

2. A wiper arm comprising a mounting head portion, an elongated hollow portion, means on said elongated hollow portion for mounting a windshield wiper, a pivotal connection between said mounting head portion and said elongated hollow portion, a spring carrying cartridge adapted to fit within said elongated hollow portion, a spring, means on said spring carrying cartridge for anchoring one end of said spring, means on said mounting head portion for anchoring the other end of said spring, a pivot on one end of said spring cartridge, a fulcrum on said mounting head portion for pivotally supporting said pivot, means on the other end of said spring carrying cartridge adapted to provide effective slidable engagement relative to a portion of the inside of said elongated hollow arm portion to thereby cause said elongated portion of said wiper arm to move toward an associated windshield under the urging of said spring and to move away from said associated windshield against the bias provided by said spring, said elongated hollow portion of said wiper arm being continuous throughout its length in the sense that there is no connection thereto for supporting said one end of said spring in view of the fact that said one end of said spring is anchored to said spring carrying cartridge, said pivotal supporting of said pivot on said fulcrum and said slidable engagement relieving friction at said pivotal connection between said mounting head portion and said elongated hollow portion.

3. A wiper arm comprising a mounting head portion adapted to be mounted on a rockshaft, an elongated hollow portion, means on said elongated hollow portion for mounting a windshield wiper, a pivotal connection joining said mounting head portion and said elongated hollow portion, a spring carrying cartridge housed within said elongated hollow portion, fulcrum means on said mounting head portion for pivotally supporting a portion of said spring carrying cartridge, a spring, means for anchoring one end of said spring to a portion of said cartridge, means for anchoring the other end of said spring to said mounting head portion, and means on said spring carrying cartridge adapted to provide effective slidable engagement relative to a portion of the inside of said elongated hollow portion to cause said elongated hollow portion to move toward an associated windshield under the urging of said spring and to permit said elongated hollow portion to move away from said associated windshield against the bias of said spring, said fulcrum means and said slidable engagement relieving friction at said pivotal connection, said spring containing cartridge and said spring being removable as a unit from said elongated hollow portion to thereby permit replacement of said spring carrying cartridge in said elongated hollow portion.

4. A wiper arm comprising a mounting head portion, an elongated hollow portion, means on said elongated hollow portion for mounting a windshield wiper, a spring carrying support adapted to be inserted within said elongated hollow portion, a spring mounted on said spring carrying support, means for coupling one end of said spring to said mounting head portion, means on said spring carrying support adapted to effectively engage a portion of the inside of said elongated hollow portion to thereby transmit spring pressure to said elongated hollow portion, first pivot means for permitting said spring carrying support to pivot on said mounting head portion, and second pivot means joining said elongated hollow portion to said mounting head portion, said first pivot means absorbing substantially the entire tension of said spring whereby substantially no spring tension is transmitted to said second pivot means, thereby permitting said second pivot means to be substantially free of friction as a result of the tension of said spring.

5. A windshield wiper arm comprising a mounting head portion, an elongated outer portion, means on said elongated outer portion for mounting a windshield wiper, means pivotally mounting said elongated outer portion on said mounting head portion, spring means for biasing said elongated portion toward an associated windshield, first means for anchoring one end of said spring means intermediate the ends of said elongated portion, second means for anchoring the other end of said spring means to said mounting head portion, fulcrum means for causing the force produced by said spring means to act about a position proximate said pivot means but spaced therefrom whereby the movement of said elongated portion of said wiper arm toward an associated windshield during operation thereof automatically results in increasing the perpendicular distance between the line of force through which said spring acts and said fulcrum means adjacent said pivot means, said increasing of said distance being at a rate which is sufficiently great to cause the moment produced by a contracted spring to be greater than the moment produced by said spring when expanded, whereby said arm provides a greater force tending to bias a wiper carried thereby toward an associated windshield when said wiper is traveling over the more rearwardly positioned lateral portion of a curved windshield than when it is traveling over the more forwardly positioned central portion of said curved windshield to thereby maintain said wiper in contact with said rearwardly extending lateral portion with a sufficiently great force to overcome the tendency of said wiper to lift from said windshield as a result of air currents impinging thereon.

6. A wiper arm comprising a mounting head portion adapted to be mounted on a rockshaft, an elongated hollow portion, means on said elongated hollow portion for mounting a windshield wiper, a pivotal connection joining said mounting head portion and said elongated hollow portion, a spring carrying support housed within said elongated hollow portion, means on said mounting head portion for supporting a portion of said spring carrying cartridge thereby relieving friction at said pivotal connection, a spring having one end thereof mounted on said spring carrying support means on said spring carrying support adapted to effectively engage a portion of the inside of said elongated hollow portion, and means for anchoring the other end of said spring to said mounting head portion, said spring carrying support and said spring being insertable as a unit into said elongated hollow portion to thereby facilitate the assembling of said spring in said elongated hollow portion by obviating the requirement for actually anchoring said spring to said elongated hollow portion.

7. A wiper arm comprising a mounting head portion adapted to be mounted on a rockshaft, an elongated hollow portion formed of a single piece of sheet material with opposite side portions joined to each other to thereby provide a section which possesses a substantially continuous cross sectional periphery substantially throughout its entire length to thereby cause said elongated hollow portion to be substantially enclosed throughout its length, means on said elongated hollow portion for mounting a windshield wiper, a pivotal connection joining said mounting head portion and said elongated hollow portion, a spring carrying cartridge housed within said elongated hollow portion, means on said mounting head portion for supporting a portion of said spring carrying cartridge, a spring having one end thereof mounted on said spring carrying cartridge, means for anchoring the other end of said spring to said mounting head portion, and means on said spring carrying cartridge adapted to effectively engage a portion of the inside of said elongated hollow portion to cause said elongated hollow portion to move toward an associated windshield under the urging of said spring and to move away from said associated windshield against the bias of said spring, said spring containing cartridge and said spring being insertable as a unit into said elongated hollow portion to thereby permit effective coupling between said spring and said substantially enclosed elongated hollow portion without requiring actual anchoring of said spring to said substantially enclosed elongated hollow portion.

8. A spring carrying support for use with a windshield wiper arm comprising a substantially rigid body, said body having a pivot portion at one end, said pivot portion having a peripheral outer edge defining a bearing surface for pivotal engagement with a mounting head of a wiper arm, abutment means for engaging the movable portion of a wiper arm located proximate the other end of said body for sliding contact relative to said movable portion, said abutment means constituting the sole engagement between said spring carrying support and said movable portion and means on said body portion for attachment to an arm biasing spring.

References Cited in the file of this patent
UNITED STATES PATENTS 2,964,775    Krohm _____ Dec. 20, 1960

FOREIGN PATENTS 827,427    Great Britain _____ Feb. 3, 1960